(12) United States Patent
Nakanishi et al.

(10) Patent No.: US 7,512,759 B2
(45) Date of Patent: Mar. 31, 2009

(54) MEMORY DEVICE

(75) Inventors: Yoshiaki Nakanishi, Suginami-ku (JP); Yoshihiko Takagi, Oota-ku (JP)

(73) Assignee: Panasonic Corporation, Osaka (JP)

( * ) Notice: Subject to any disclaimer, the term of this patent is extended or adjusted under 35 U.S.C. 154(b) by 450 days.

(21) Appl. No.: 10/549,028

(22) PCT Filed: Mar. 23, 2004

(86) PCT No.: PCT/JP2004/003943

§ 371 (c)(1), (2), (4) Date: Sep. 15, 2005

(87) PCT Pub. No.: WO2004/086234

PCT Pub. Date: Oct. 7, 2004

(65) Prior Publication Data

US 2006/0200864 A1  Sep. 7, 2006

(30) Foreign Application Priority Data

Mar. 26, 2003  (JP)  ............... 2003-085298

(51) Int. Cl.
*G06F 12/12* (2006.01)
(52) U.S. Cl. ...................... 711/163; 717/158
(58) Field of Classification Search ............. 711/163, 711/164
See application file for complete search history.

(56) References Cited

U.S. PATENT DOCUMENTS

| | | | |
|---|---|---|---|
| 4,817,091 A | 3/1989 | Katzman et al. | |
| 5,623,637 A | 4/1997 | Jones et al. | |
| 5,875,480 A | 2/1999 | Le Roux et al. | |
| 6,195,732 B1 * | 2/2001 | Adams et al. | ............... 711/156 |
| 2002/0169960 A1 | 11/2002 | Iguchi et al. | |

FOREIGN PATENT DOCUMENTS

| | | |
|---|---|---|
| CN | 1147793 | 10/2001 |
| EP | 1050821 | 11/2000 |
| EP | 1050821 A2 * | 11/2000 |
| JP | 4-117589 | 4/1992 |
| JP | 04-117589 A | 4/1992 |
| JP | 5-173890 | 7/1993 |
| JP | 05-173890 A | 7/1993 |

(Continued)

OTHER PUBLICATIONS

"Interface", Mar. 2003, CQ Shuppansha, pp. 49-50, (Cited in Specification, English Translation of Pertinent Paragraph).

(Continued)

*Primary Examiner*—Hyung S Sough
*Assistant Examiner*—Hamdy S Ahmed
(74) *Attorney, Agent, or Firm*—Pearne & Gordon LLP

(57) ABSTRACT

A memory device includes a memory area directly inaccessible from an electronic device; a secure control section that manages access to this memory area; and a device control section that communicates with the electronic device and transfers a request of the electronic device to the secure control section. The secure control section temporarily delegates, to a device control section, access rights to the memory area if there is write/read request of large capacity data from an authenticated electronic device, and the device control section to which this access rights have been delegated write/read data sent from the electronic device into/from the memory area by burst transfer.

10 Claims, 7 Drawing Sheets

FOREIGN PATENT DOCUMENTS

| | | |
|---|---|---|
| JP | 2000-306067 | 11/2000 |
| JP | 2000-306067 A | 11/2000 |
| JP | 2002-229861 A | 8/2002 |
| JP | 2002-304316 | 10/2002 |
| JP | 2002-304316 A | 10/2002 |
| JP | 2003-5644 | 1/2003 |
| JP | 2003-005644 A | 1/2003 |
| JP | 2003-16404 | 1/2003 |
| JP | 2003-016404 A | 1/2003 |
| JP | 2004-42288 | 2/2003 |
| WO | 00-67097 | 11/2000 |

OTHER PUBLICATIONS

European Office action dated Dec. 20, 2007.
Japanese Office Action Sep. 9, 2008.

* cited by examiner

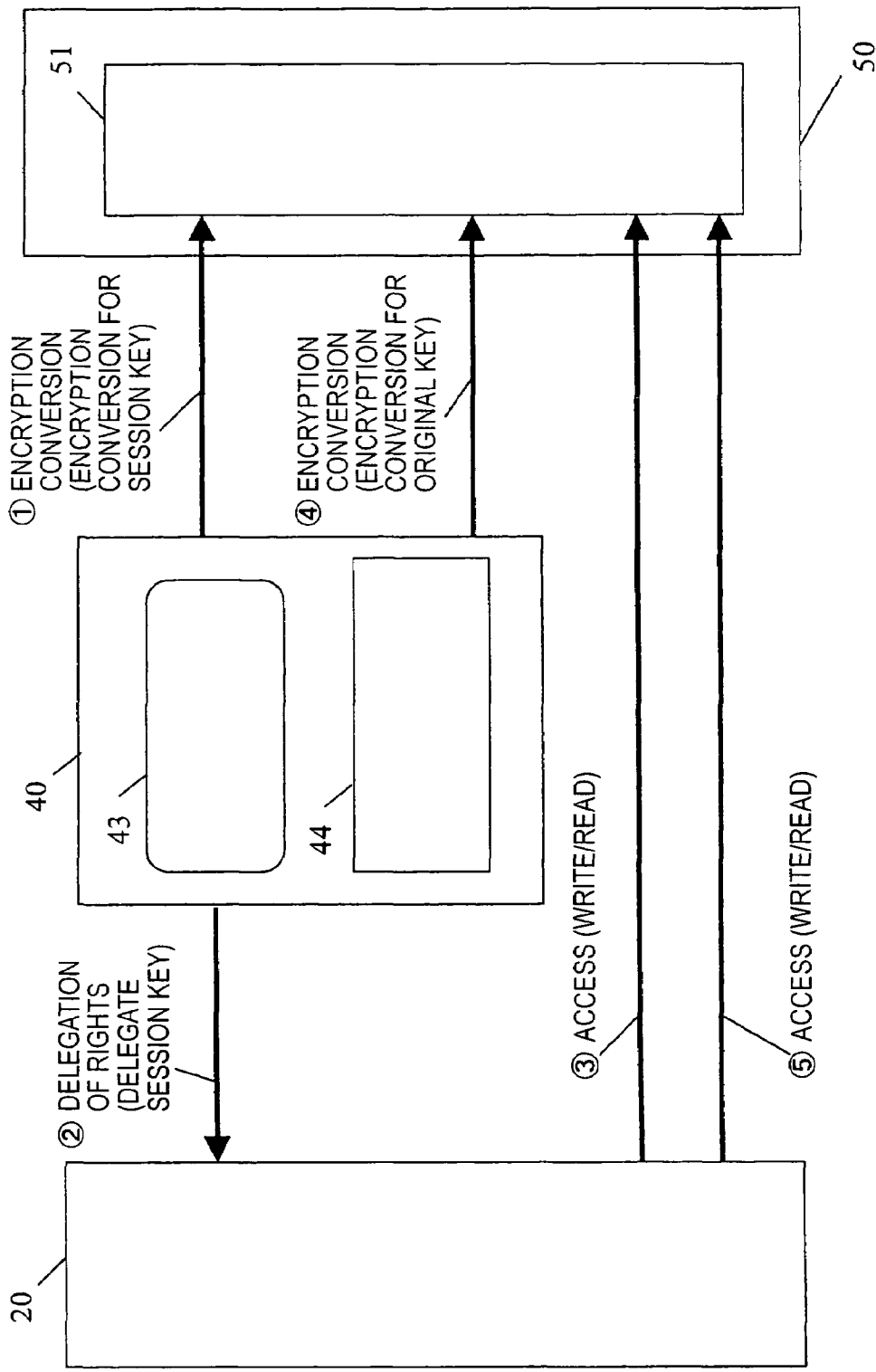

MEMORY DEVICE

TECHNICAL FIELD

The present invention relates to memory devices such as semiconductor memory cards, and more particularly to those attempting to make faster data writing into and reading from an area having confidentiality.

BACKGROUND ART

Smart cards, which have been increasingly used in electronic commerce in recent years, have a CPU on board and can perform intelligent processing, unlike simple memory cards. The smart cards have a memory area within a module having tamper resistance (tamper resistant module: TRM); therefore, they can securely keep data confidential and have strict resistance to forgery and duplication. However, the memory capacity of the smart cards is about several ten kilobytes, and they cannot store as much data as can memory cards that are intended for data storage.

A process performed by a smart card commences by staring up a card application that is incorporated in the smart card, using a terminal application program (hereafter, the term "application program" is abbreviated as "application"). The process proceeds while making communication in which the terminal application transmits a command and the card application sends back a response thereto. The international standard ISO/IEC 7816 specifies an international standard concerning the exchange of command and response, which specifies that commands take the form referred to as APDU (Application Protocol Data Unit). (See Non-Patent Reference 1: "Interface" March 2003, CQ Shuppansha, pp. 49-50.)

Applicant previously developed a memory card (hereinafter this card is referred to as a "secure memory card") that has both intelligent characteristics of smart cards and memory capacity comparable to memory cards (Japanese Patent Application No. 2003-042288). This secure memory card comprises a first non-tamper resistant memory having a normal area that is accessible from a terminal and a secure area that cannot be directly accessed from a terminal, and a second tamper resistant memory that cannot be directly accessed from a terminal; and it is configured so that the secure area of the first memory can be accessed only through a secure control section that manages access to the second memory.

Thus, the secure area can be utilized as a confidential area having a large capacity even though the configuration of the memory area is non-tamper resistant, and this secure area can handle large data of several ten megabytes, far larger than that can be handled by the second tamper resistant memory.

Nevertheless, the following problem arises when writing large capacity data that a card application uses into the secure area according to the APDU, specified by ISO/IEC 7816. The amount of data that can be transferred from a terminal to a card at a time is restricted to at most about 64 KB (about 256 bytes with many smart cards) by the standard; therefore, when writing a data amount of several ten megabytes, the data must be divided and handled several hundred to several thousand times, so it takes several minutes to several hours until the writing finishes. Such a lengthy write time becomes a great obstacle when the same data are written into a large number of secure memories, for example, over 1000 memories, before shipment.

DISCLOSURE OF THE INVENTION

The invention resolves such problems, and its object is to provide a memory device that can write and read large capacity data into/from a secure area in a short time.

Accordingly, the invention provides a memory device fixedly or detachably connected to an electronic device, comprising a memory area that is directly inaccessible from the electronic device, a secure control section that manages access to the memory area, and a device control section that communicates with the electronic device and transfers a request from the electronic device to the secure control section, wherein the secure control section temporarily delegate, to the device control section, access rights to the memory area if there is a write or read request of large capacity data from an authenticated electronic device, and the device control section to which the access rights have been delegated writes data sent from the electronic device into the memory area by burst transfer, or sends data read from the memory area to the electronic device by burst transfer.

Consequently, the number of times of command interchange reduces due to the burst transfer of data, making the process faster.

Moreover, the process of the secure control section is performed with a command standardized by APDU, and therefore, this memory device has high compatibility with existing international standards for smart cards. By setting a command concerning the process of the device control section within the frame of APDU, the memory device can support existing international standards for smart card without modifications. Even when setting a special-purpose command, the memory card can maintain compatibility with slight change in the terminal application.

BRIEF DESCRIPTION OF THE DRAWINGS

FIG. 8 is a diagram showing an encryption conversion procedure in the two-chip configuration according to the second embodiment of the invention.

Figure 1:
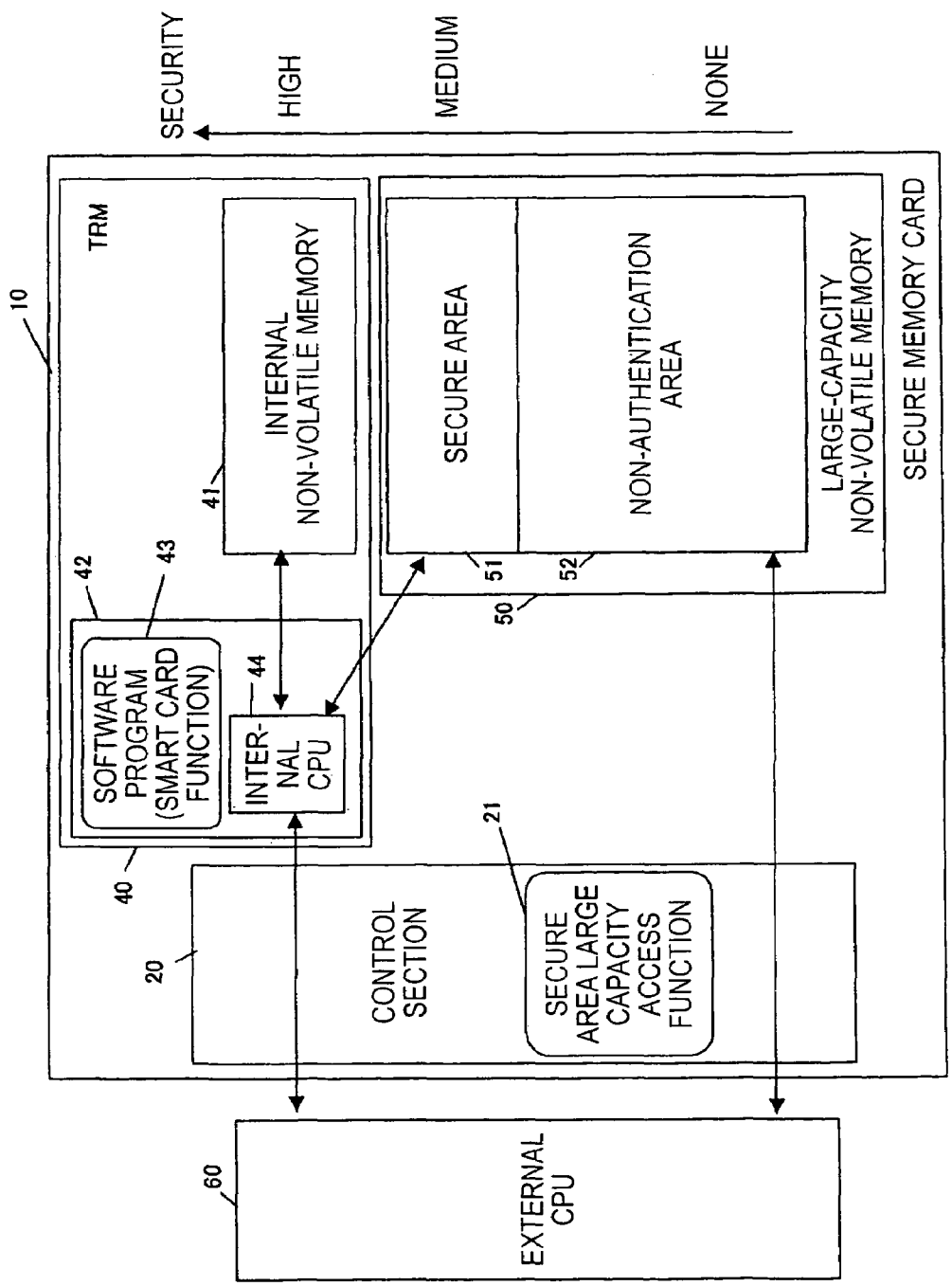
FIG. 1 is a block diagram showing the configuration of a secure memory card according to a first embodiment of the invention.

Reference numerals in the drawings respectively represent the following:

10—secure memory card; 20—control section; 21—secure area large capacity access function; 40—tamper resistant module; 41—internal non-volatile memory; 42—secure control section; 43—smart card function software program; 44—internal CPU; 50—large-capacity non-volatile memory; 51—secure area; 52—non-authentication area; and 60—external CPU of terminal apparatus.

BEST MODE FOR CARRYING OUT THE INVENTION

First Embodiment

A secure memory card according to a first embodiment of the invention comprises, as shown in FIG. 1, tamper resistant module 40 including an internal non-volatile memory 41 and a secure control section 42; a large-capacity non-volatile memory 50 including an non-authentication area 52 and a secure area 51; and a control section (device control section) 20 that communicates with an external CPU 60 of a terminal device (read/write device) and controls access to a memory area of the terminal device.

The secure control section 42 has an internal CPU 44 including a CPU, a ROM, a RAM, and an encryption engine, a card application software program 43 for implementing a smart card function, and the secure control section 42 can access the internal non-volatile memory 41 and the secure area 51.

The control section 20 has a card application that implements a secure area large capacity access function 21 for writing large capacity data into the secure area 51 (or reading out the data therefrom). When an external CPU 60 of a terminal device that is a communication partner requests access to the non-authentication area 52, the control section 20 unconditionally permits the access, whereas when the terminal device's request is for the internal non-volatile memory 41 or the secure area 51, the control section transfers the request to the secure control section 42. In addition, when access rights from the secure control section 42 to the secure area 51 are delegated, the control section performs the secure area large capacity access function 21.

The internal non-volatile memory 41 of the TRM 40 comprises an EEPROM that can erase/write data by 16 bytes, and the large-capacity non-volatile memory 50 comprises, for example, a flash memory that is capable of erasing by a block of 512 bytes etc. and a flash memory that is capable of writing data by 1 byte.

A difference between the secure area 51 and the internal non-volatile memory 41 is that while the internal non-volatile memory 41 is provided in the TRM 40, the secure area 51 is provided in a non-tamper resistant large-capacity non-volatile memory 50. For that reason, the secure area 51 can have a larger storage capacity than the internal non-volatile memory 41, but on the other hand, its security level is lower than the internal non-volatile memory 41 provided in the TRM 40. The security levels for the three areas are: the security level of the non-authentication area 52 is the lowest, the secure area 51 is higher, and the internal non-volatile memory 41 is even higher.

The control section 20 interprets a command received from the external CPU 60, and determines whether the command requests access to the non-authentication area 52 or requests processing by the smart card function. If access to the non-authentication area 52 is requested, the control section unconditionally permits the access request, whereas if processing by the smart card function is requested, the control section transfers the command to the secure control section 42.

The smart card function 43 that operates on the secure control section 42 interprets a command transmitted from the control section 20 and determines if: the process request is that requesting write-in/read-out of data to/from the internal non-volatile memory 41; it is that requesting write-in/read-out of data to/from the secure area 51; it is that requesting authentication; or it is that requesting other processing.

When the command requests authentication, authentication processing is performed. On the other hand, when the command requests write-in/read-out of data to/from the internal non-volatile memory 41 or the command requests write-in/read-out of data to/from the secure area 51, the control section confirms whether or not the authentication process has finished and permits the request if the authentication process has finished. The write-in data are encrypted with an encryption key retained by the internal non-volatile memory 41 and are written into the internal non-volatile memory 41 or the secure area 51. Conversely, when reading out, data are read out from the internal non-volatile memory 41 or the secure area 51 and are decrypted with a decryption key retained by the internal non-volatile memory 41, and the data are transferred through the control section 20 to the terminal device.

Figure 2:
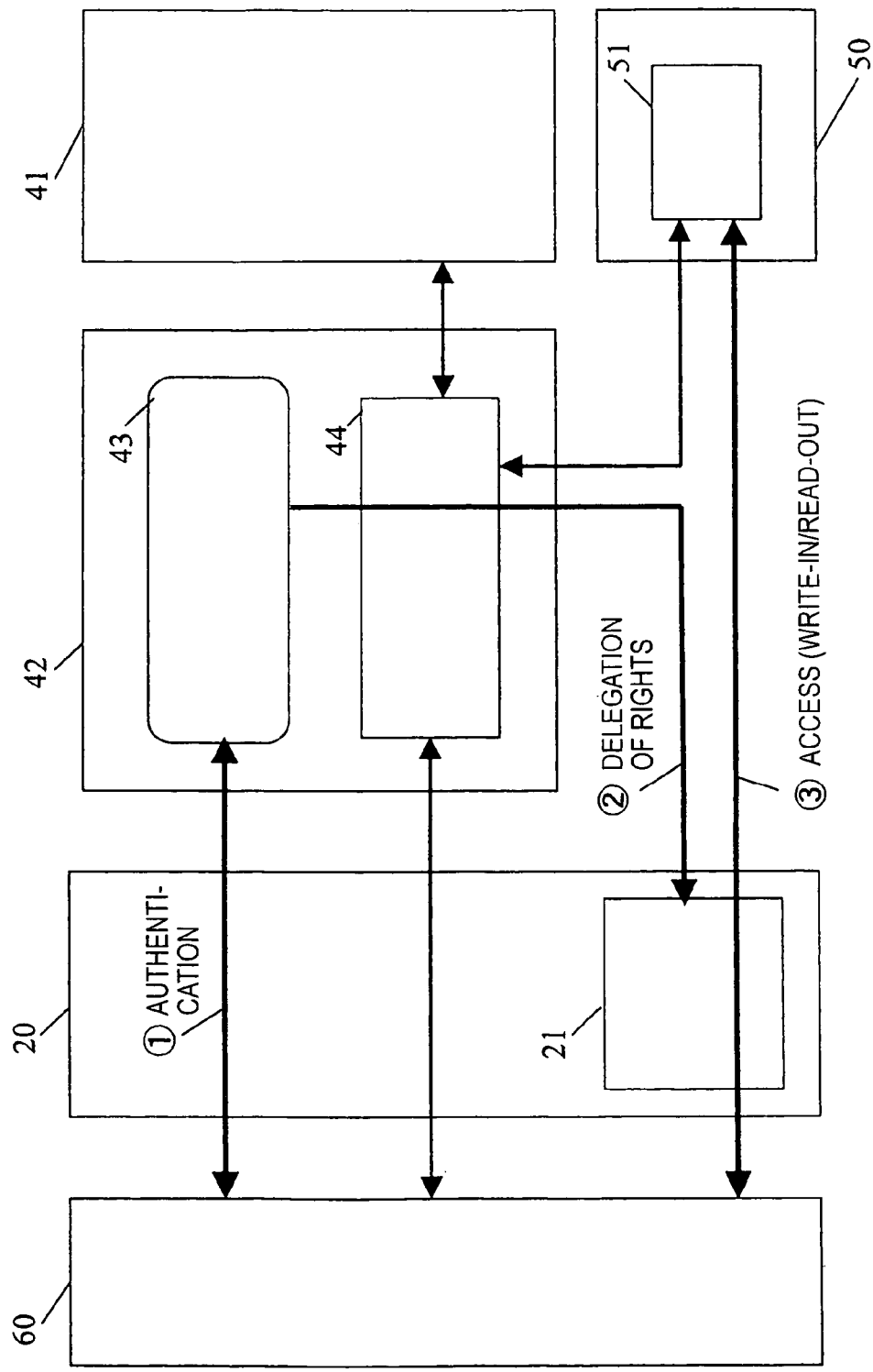
FIG. 2 is a diagram schematically showing an operation of the secure memory card according to the first embodiment of the invention.

Meanwhile, as schematically shown in FIG. 2, when there is a the terminal device sends a write-in (or read-in) request for large capacity data, the smart card function 43 that operates in the secure control section 42 authenticates the terminal device 60 such as a mobile telephone ([1]), and temporarily delegates, to the control section 20, access rights (and the right to use an encryption key) to the secure area 51 if the authentication finishes successfully ([2]). The control section 20 that has received this delegation starts up the secure area large capacity access function 21, encrypts large capacity data sent from the terminal device 60, and writes the data into the secure area 51 (or it reads out large capacity data from the secure area 51, decrypts the data, and sends the data to the terminal device 60) ([3]).

Figure 3:
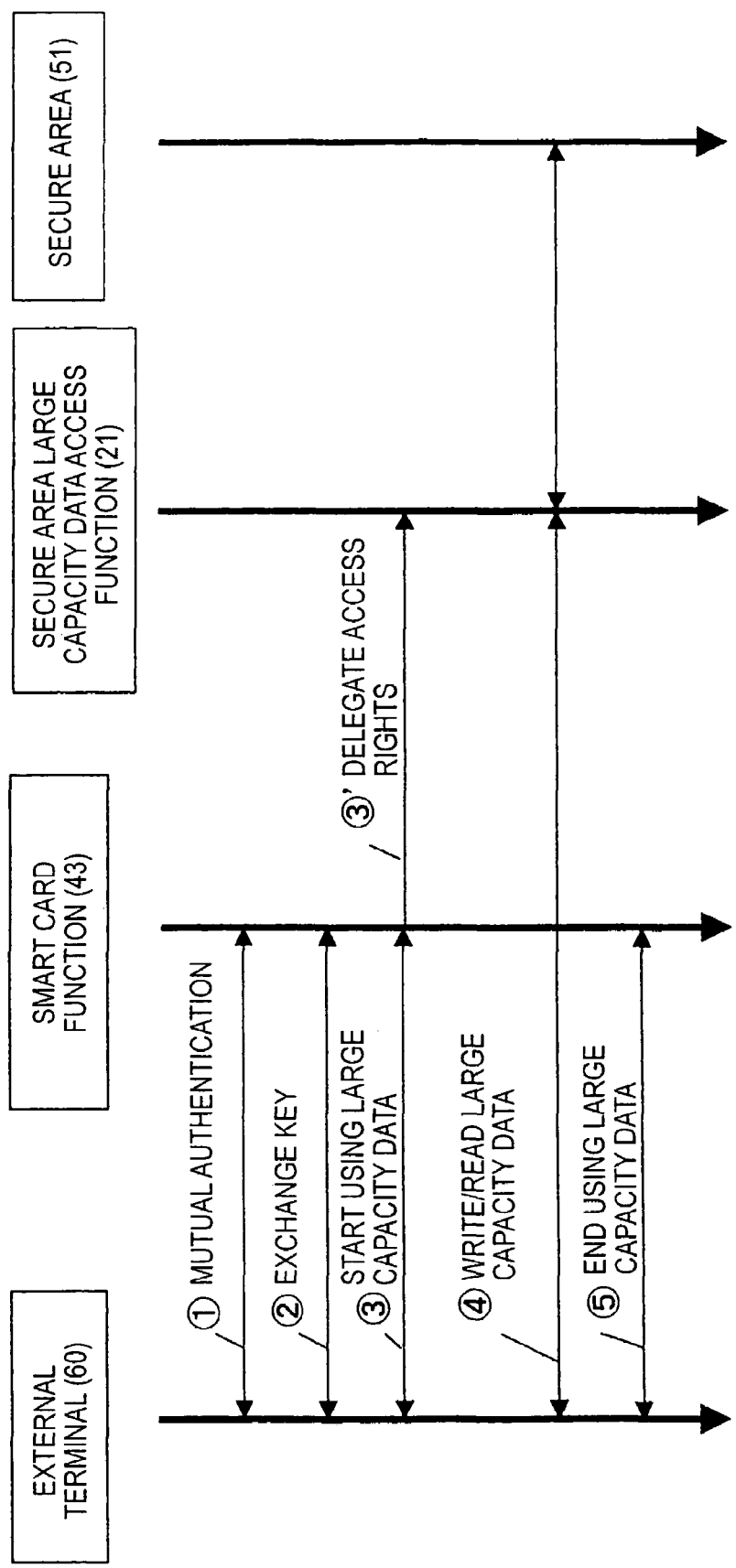
FIG. 3 is a flowchart showing an operation procedure of the secure memory card according to the first embodiment of the invention.

FIG. 3 shows the process flow of the terminal 60 and the secure memory card in this case.

The terminal 60 requests authentication, and the smart card function 43 operating in the secure control section 42 performs mutual authentication with the terminal 60 ([1]). Subsequently, they exchange a session key that is used only for this communication ([2]).

As a method of exchanging a session key, for example, the DH (Diffie-Hellman) method is well-known. With this key exchange method, in the case of exchanging a session key K between the terminal 60 and the secure control section 42, the terminal 60 and the secure control section 42 firstly computes e from p and Z by the calculation formula e=Zmodp, with the use of shared information, for example, the month (p) and the date (Z) of the current date. Subsequently, the terminal 60 generates and holds a random number a, generates m by the calculation formula m=e^a, and transmits the resulting m to the secure control section 42. Meanwhile, the secure control section 42 generates and holds a random number b, generates n by the calculation formula n=e^b, and transmits the resulting n to the terminal 60.

The terminal 60 that has received n generates a session key K by the formula K=n^a=e^ab, and the secure control section 42 that has received m generates the same session key K as that of the terminal 60 by the formula K=m^b=e^ab.

The terminal 60 that has performed key exchanging sends an access request to the secure area 51 and the smart card function 43 returns a response ([3]). The smart card function 43 delegates, to the control section 20, access rights to the secure area 51 and passes the session key and the encryption key (secure area key) for the data stored in the secure area 51 to the control section 20. The control section 20 starts up the secure area large capacity access function 21 ([3]').

In the case of a write request, the terminal 60 sends large capacity data encrypted by the session key. The secure area large capacity access function 21 of the control section 20 decrypts large capacity data that are sequentially received with the session key, encrypts them with the secure area key, and writes them into the secure area 51 ([4]). Upon completion of the writing the large capacity data, the terminal 60 sends a termination request, and the smart card function 43 returns a response and turns the access rights given to control section 20 invalid ([5]).

It should be noted that the secure area large capacity access function 21 may write data into the secure area 51 without encrypting them and the smart card function 43 may later encrypt the data that have written into the secure area 51. In this case, the smart card function 43 need not pass the secure area key to the control section 20 in the delegation of access rights.

On the other hand, when the terminal 60 requests reading of large capacity data, the secure area large capacity access function 21 of the control section 20 that has started up at [3]' reads out data that are the subject of the read request from the secure area 51; it decrypts the data with the secure area key and thereafter encrypts the data with the session key, and sends the data to the terminal 60. The terminal 60 decrypts the encrypted data with the session key and uses the data ([4]) Upon completion of the acquisition of the large capacity data that have been the subject of the read request, the terminal 60 acknowledges the termination of reading; the smart card function 43 returns a response and turns the access rights given to the control section 20 invalid ([5]).

Figure 4:
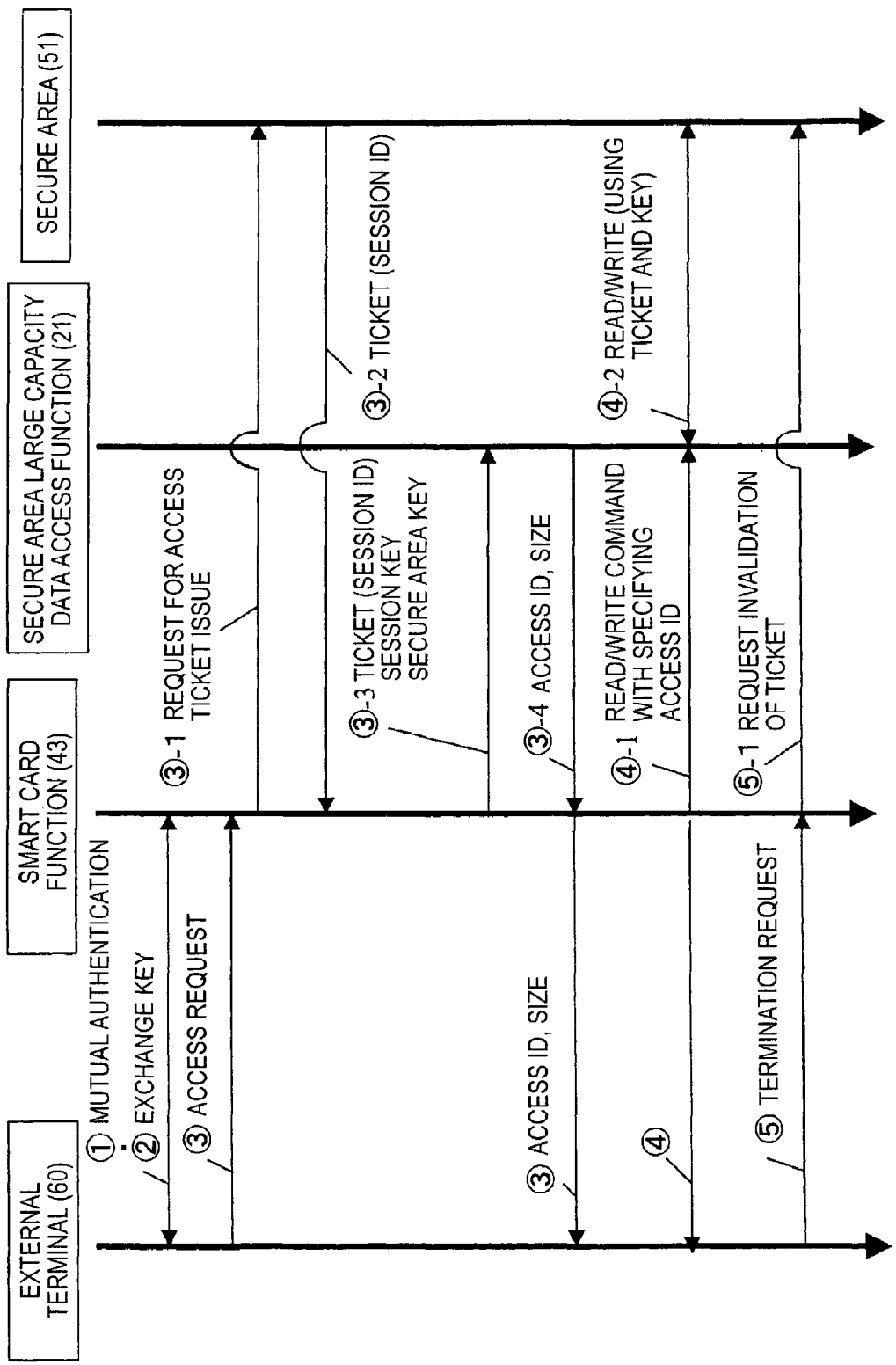
FIG. 4 is a flowchart showing a detailed operation procedure of the secure memory card according to the first embodiment of the invention.

The flowchart of FIG. 4 shows one example of a detailed process procedure performed in the smart card function 43, the secure area large capacity access function 21 and the secure area (management mechanism) 51 during this process.

When the terminal 60 that has finished authentication and key exchange ([1], [2]) sends an access request ([3]), the smart card function 43 requests an issue of an access ticket ([3]-1) which authenticates access rights of the secure area 51, and the secure area 51 issues a ticket with a session ID attached ([3]-2). The smart card function 43 passes the ticket, the session key, and the secure area key to the secure area large capacity access function 21, and delegates access rights thereto ([3]-3). Upon receiving these, the secure area large capacity access function 21 sets an access ID and a data size ([3]-4), and these access ID and size are contained in the response to the access request and sent to the terminal 60 ([3]).

The terminal 60 sends a writing/reading command for large capacity data to the secure area large capacity access function 21 with specifying the access ID ([4]-1), and the secure area large capacity access function 21 executes writing or reading of large capacity data into/from the secure area 51 using the access ticket and the keys (the secure area key and the session key) ([4]-2).

When the terminal 60 makes a termination request ([5]), the smart card function 43 requests the secure area 51 to invalidate the ticket ([5]-1). It should be noted that detecting the end of writing/reading, the secure area 51 may automatically invalidate the ticket.

Thus, in the case of performing writing or reading of large capacity data, this secure memory card 10 carries out the process by the smart card function 43 (mutual authentication, key exchange), performs the process by the secure area large capacity access function 21, and lastly performs the termination process by the smart card function 43.

In the process of the secure area large capacity access function 21, data are transferred by burst transfer. Therefore, by reducing the number of times of command interchange, and an overhead (the time not used directly for the task that is intended) can be reduced, making the process faster. The burst transfer can handle data in the order of MB (megabytes) at one time, making it possible to shorten the write time for the data amount to several seconds to several minutes.

In addition, the mutual authentication, key exchange process, and termination process by the smart card function 43 of the secure memory card 10 are of course performed with commands standardized by APDU, but by setting commands concerning writing-reading processes of large capacity data by the secure area large capacity access function 21 within the frame of APDU, the memory card can support the existing international standards for smart card without modifications.

Moreover, it is also possible to provide special-purpose commands for writing-reading processes of large capacity data, and in this case too, the secure memory card 10 can be used only with slight modifications to a terminal application of a terminal device that is compatible to the existing international standards for smart cards.

Furthermore, by encrypting large capacity data with a session key, leak accidents of the large capacity data during transfer can be prevented. It should be noted that the encryption with a session key may be omitted when the writing and reading of large capacity data is carried out in an environment in which security is ensured (for example, during the manufacturing of the secure memory card).

Second Embodiment

A second embodiment of the invention describes a scheme to avoid an accident that is anticipated when access rights to a secure area are given to a control section. In this description, the same reference numerals as in FIG. 1 are used.

It is anticipated that when performing writing-reading of large capacity data according to the method of the first embodiment, such accidents can occur that data are read out illegally from the secure area 51, data are illegally written into the secure area 51, or the secure area key to be passed to the control section 20 leaks, through the control section 20 during the time in which the control section 20 retains access rights to the secure area 51.

In order to prevent such situations, as for the timing of giving access rights, it is necessary to give access rights of the secure area 51 to the control section 20 immediately before the actual writing and reading of large capacity data is performed and to invalidate the access rights as soon as the process finishes.

It is also possible to give the control section 20 access rights, with which the accessible area in the secure area 51 is restricted, in order to prevent the damage from extending even when an unexpected situation occurs.

Figure 5:
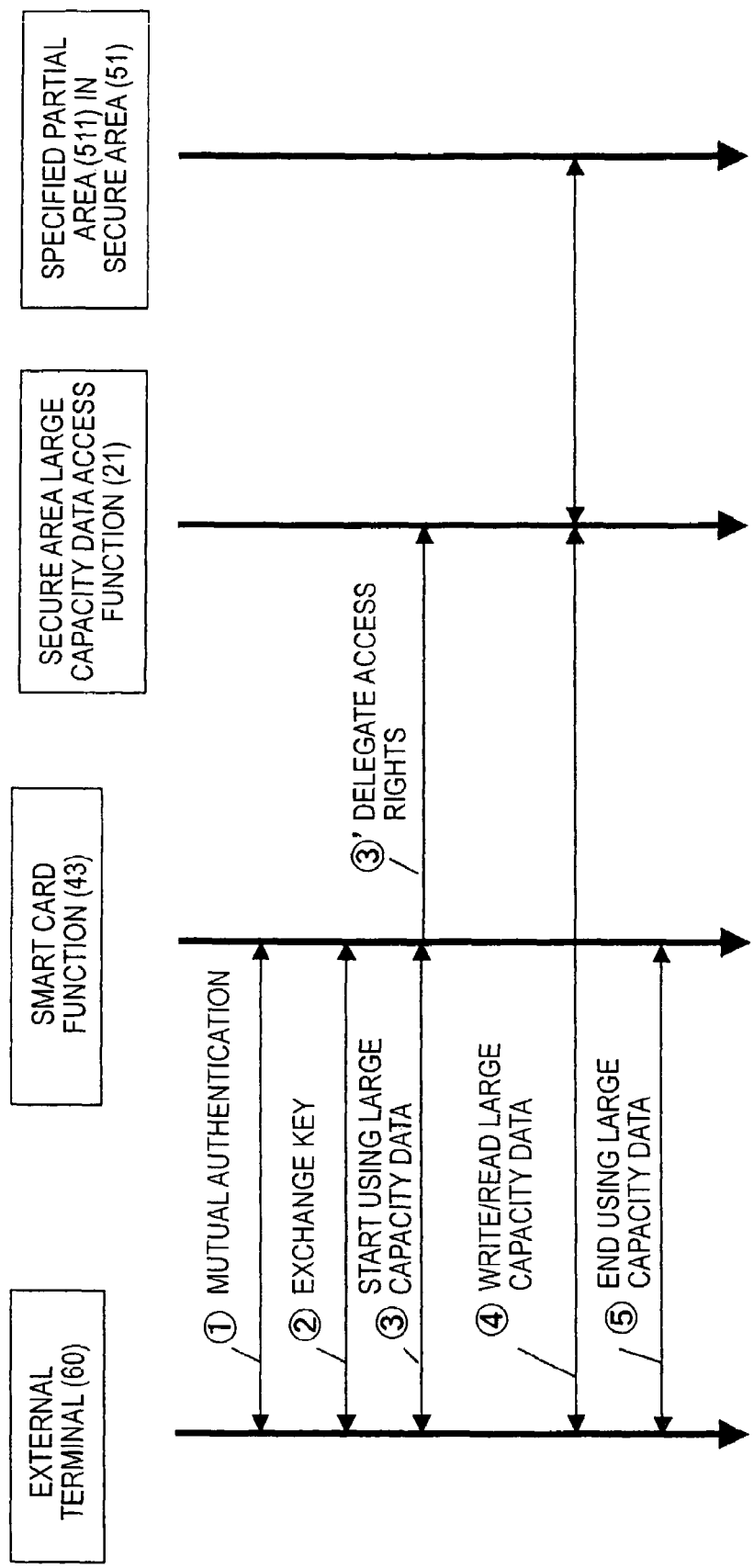
FIG. 5 is a flowchart showing an operation procedure of a secure memory card according to a second embodiment of the invention.

FIG. 5 shows a process flow in this case. The smart card function 43 performs mutual authentication with the terminal 60 ([1]), and performs key exchange ([2]). In response to an access request from the terminal 60 ([3]), the smart card function delegates, to the control section 20, access rights to a specified area 511 in the secure area 51 ([3]').

At this time, the smart card function 43 requests the secure area 51 to issue an access ticket that specifies a file or an area in the flow of FIG. 4 ([3]-1), and passes the ticket obtained to the control section 20.

In the case of a write request, the terminal 60 sends large capacity data encrypted with a session key; the secure area large capacity access function 21 of the control section 20 decrypts the large capacity data that are received sequentially with the session key and encrypts the data with a secure area key, and writes the data into the specified area 511 in the secure area 51 ([4]).

On the other hand, when the terminal 60 requests reading of large capacity data, the secure area large capacity access function 21 of the control section 20 reads out the data subjected to the read request from the specified area 511 in the secure area 51. It decrypts the data with the secure area key and thereafter encrypts the data with the session key, and sends the data to the terminal 60.

The processes that follow are identical those in the case of FIG. 3.

Thus, by restricting the access rights to the secure area 51 given to the control section 20 to prohibit access to other areas than the specified area, it is possible to prevent the data stored in other locations in the secure area 51 from destruction even if an unlikely accident should occur.

Figure 6:
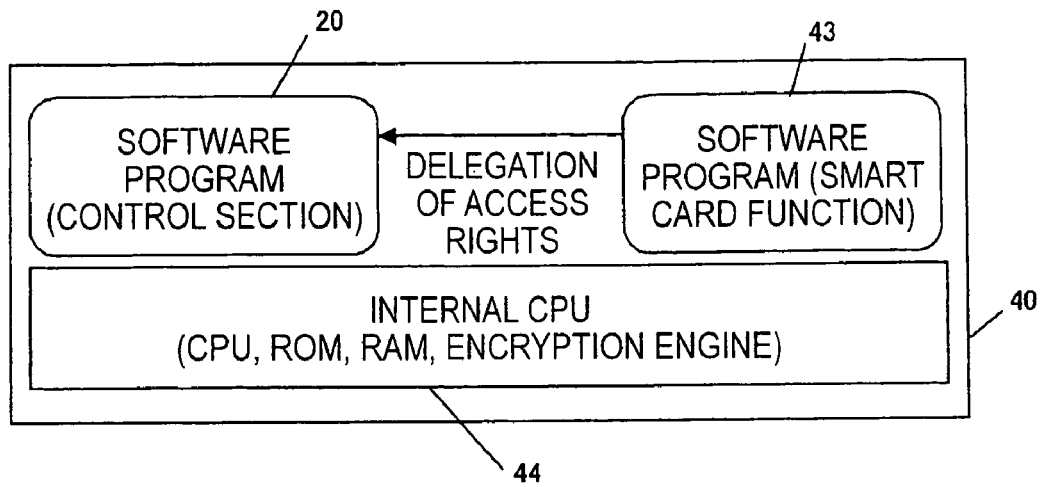
FIG. 6 is a diagram showing a one-chip configuration according to the second embodiment of the invention.

Moreover, as shown in FIG. 6, when a software program 20 of the control section and a software program 43 of the smart card function are implemented in a single chip (TRM) 40, access rights to the secure area 51 can be delegated to the control section 20 by internal communication between the software programs 20 and 43, and an encryption engine used by the control section 20 can be shared between the control section 20 and the smart card function 43. Thus, in the case of using the one-chip implementation, the control section software program 20 is protected by a hardware protection comparable to that for the smart card function 43, access rights can be delegated to the control section 20 simply and safely.

Figure 7:
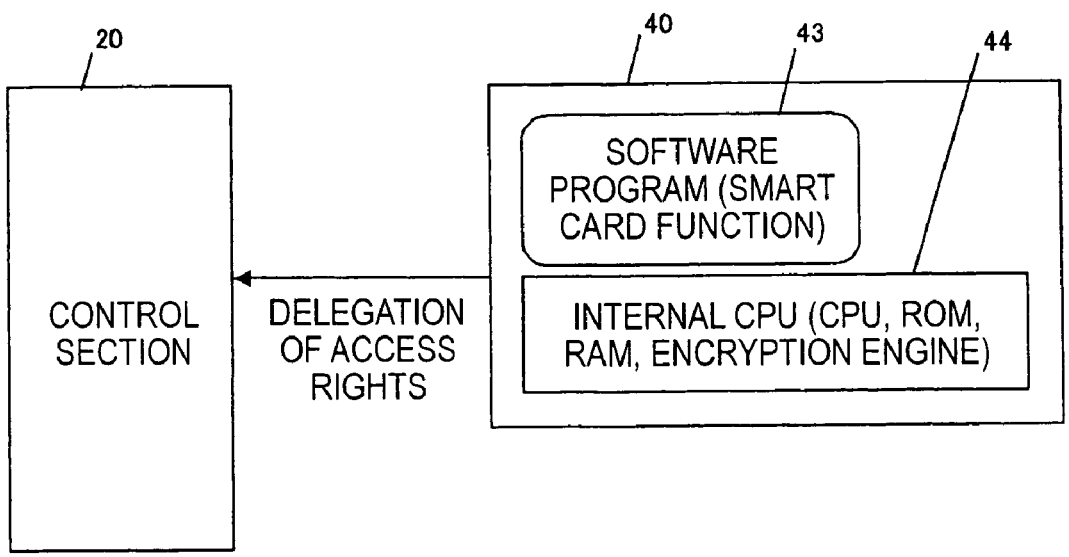
FIG. 7 is a diagram showing a two-chip configuration according to the second embodiment of the invention.

On the other hand, in the case of implementing the control section 20 and the smart card function 43 by separate chips, as shown in FIG. 7, the secure area key passed from the smart card function 43 to the control section 20 when delegating access rights may leak by monitoring the connection between the chips. In order to prevent this, it is desired that the communication between the smart card function 43 and the control section 20 should be encrypted. For this encryption, a shared key set in advance during the manufacture is used, or a common key that is dynamically key-exchanged is used.

Moreover, it is possible to use data recorded in the secure area 51 as a secure area key so that it is not necessary to transfer key information between the chips. In this case, the control section 20 that has accessed the secure area 51 reads the data to be a secure area key and using the data, it encrypts large capacity data and writes them into the secure area 51.

Further, it is conceivable that the data in the secure area 51 may be modified if the control section 20 illegally retains delectated access rights. In order to prevent such a situation, it is desirable that the secure area key is converted before and after access rights to the secure area 51 is given to the control section 20. FIG. 8 shows the procedure in this case.

First, the smart card function 43 converts an encryption key A that is used for encrypting the data stored in the secure area 51 into a secure area key B. As this secure area key B, a session key may be used ([1]). In the case of reading large capacity data from the secure area 51, the data of the secure area 51 that have been encrypted with the encryption key A are decrypted and again encrypted with the secure area key B.

Next, access rights to the secure area 51 are delegated to the control section 20 and the secure area key B is passed thereto ([2]). The control section 20 to which access rights have been delegated accesses to the secure area 51; in the case of writing large capacity data, the control section encrypts the large capacity data with the secure area key B and writes the data into the secure area 51. In the case of reading large capacity data, it decrypts large capacity data read from the secure area 51 with the secure area key B ([3]). Upon completion of writing/reading of the large capacity data, the smart card function 43 performs conversion in which the secure area key B is converted back to the encryption key A, and again encrypts the data stored in the secure area 51 with the encryption key A ([4]).

After this process, even if the control section 20 attempts to access the data in the secure area 51 using the secure area key B, data reading fails because the key is different ([5]).

Thus, even when the control section 20 and the smart card function 43 are provided in separate chips, unauthorized use can be prevented by encryption conversion.

The embodiments have described writing/reading of large capacity data to/from the secure area of the secure memory card. Nevertheless, in the case where the capacity of the internal non-volatile memory 41 of the secure memory card 10 is increased or in the case where the memory area of smart card is increased, the invention is also applicable when writing/reading of large capacity data is performed for these memories.

Although the present invention has been described in detail with reference to specific preferred embodiments thereof, it will be apparent to those skilled in the art that various changes and modifications may be made herein without departing from the scope and sprit of the present invention.

The present application is made based on Japanese Patent Application No. 2003-085298, filed on Mar. 26, 2003, the content of which is incorporated by reference herein.

INDUSTRIAL APPLICABILITY

As is obvious from the foregoing description, the memory device of the invention can perform writing/reading of large capacity data in a short time and safely.

Moreover, the memory device of the invention has high compatibility with the existing international standards for smart cards.

The invention claimed is:

1. A memory device comprising:
   a secure area inaccessible directly from an electronic device;
   a secure control section which manages access to the secure area; and
   a device control section which communicates with the electronic device and transfers a request from the electronic device to the secure control section,
   wherein the secure control section temporarily delegate, to the device control section, access rights to the secure area if there is a write or read request of large capacity data from an authenticated electronic device, and
   wherein the device control section to which the access rights have been delegated writes data sent from the electronic device into the secure area by burst transfer, or sends data read from the secure area to the electronic device by burst transfer.

2. The memory device according to claim 1,
   wherein the secure control section gives a secure area key used for encrypting or decoding data of the secure area to the device control section to which the access rights are delegated, and
   wherein the device control section encrypts data to be written into the secure area with the secure area key, or decrypts data read out from the secure area with the secure area key.

3. The memory device according to claim 2,
   wherein the secure control section encrypts the secure area key and sends the key to the device control section, and wherein the device control section decrypts the secure area key and uses the key.

4. The memory device according to claim 2,
wherein the secure control section gives, to the device control section, the secure area key that has been subjected to a conversion process, and
wherein the secure control section invalidates the access rights that have been delegated to the device control section and thereafter reconverts the secure area key to an original state.

5. The memory device according to claim 1, wherein the device control section encrypts data to be written into the secure area or decrypts data read out from the secure area, using data stored in the secure area.

6. The memory device according to claim 1,
wherein the secure control section exchanges a session key with the electronic device that has been authenticated and gives the session key to the device control section that the access rights are delegated, and
wherein the device control section decrypts data received from the electronic device with the session key or encrypts data to be transmitted to the electronic device with the session key.

7. The memory device according to claim 1, wherein the secure control section delegates, as the access rights, access rights that are restricted to a partial area of the secure area.

8. The memory device according to claim 1, wherein the secure control section and the device control section are formed on a same chip.

9. The memory device according to claim 1, wherein the secure control section and the device control section are formed on separate chips.

10. The memory device according to claim 1, wherein the memory device is fixedly or detachably connected to the electronic device.

* * * * *